United States Patent [19]

Wallace et al.

[11] Patent Number: 4,522,883

[45] Date of Patent: Jun. 11, 1985

[54] CIRCUMFERENTIALLY WRAPPED CARBON-CARBON STRUCTURE

[75] Inventors: Gary A. Wallace; James E. Zimmer, San Jose, Calif.

[73] Assignee: The United States of America as represented by the Secretary of the Air Force, Washington, D.C.

[21] Appl. No.: 578,335

[22] Filed: Feb. 9, 1984

[51] Int. Cl.³ ............................................. B64G 1/58
[52] U.S. Cl. ................................ 428/365; 244/158 A; 423/447.2; 423/447.4; 423/447.8; 428/367; 428/368; 428/377; 428/408
[58] Field of Search ................ 244/158 A; 423/447.2, 423/447.4, 447.8; 428/365, 367, 368, 377, 408

[56] References Cited

U.S. PATENT DOCUMENTS

| 492,506 | 2/1893 | Ayer . | |
|---|---|---|---|
| 1,355,106 | 10/1929 | Johnstone . | |
| 2,367,203 | 1/1945 | Cooper . | |
| 2,980,356 | 4/1961 | Beese et al. . | |
| 3,573,123 | 3/1971 | Siegel et al. | 428/408 |
| 3,713,959 | 1/1973 | Rottmayer | 428/367 |
| 3,826,707 | 7/1974 | Olcott | 428/368 |
| 4,102,512 | 7/1978 | Lewallyn | 242/66 |
| 4,160,528 | 7/1979 | Malone, Sr. et al. | 242/56 R |
| 4,275,493 | 6/1981 | Matovich et al. | 428/408 |
| 4,318,948 | 3/1982 | Hodgson | 428/365 |
| 4,396,824 | 8/1983 | Fiegel et al. | 428/408 |

Primary Examiner—James C. Cannon
Attorney, Agent, or Firm—Donald J. Singer; Charles E. Bricker

[57] ABSTRACT

A carbon-carbon structure useful for fabricating a nose-tip for a reentry vehicle, which consists essentially of a central core, a plurality of layers of woven carbon fabric circumferentially wrapped around the core, and a carbon binder, wherein the core consists essentially of a plurality of longitudinally oriented carbon fibers.

10 Claims, 3 Drawing Figures

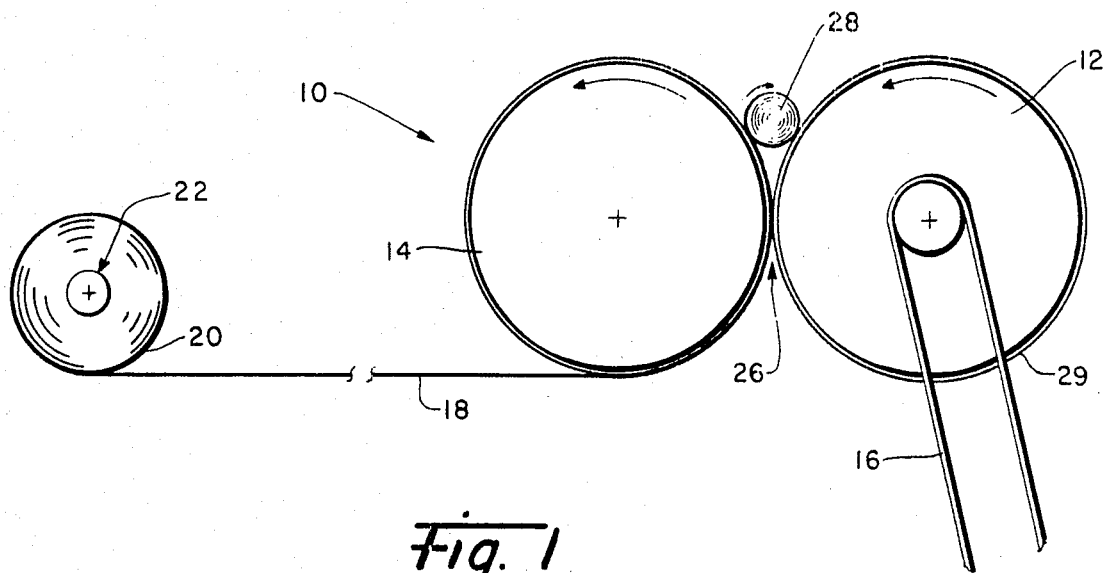
Fig. 1
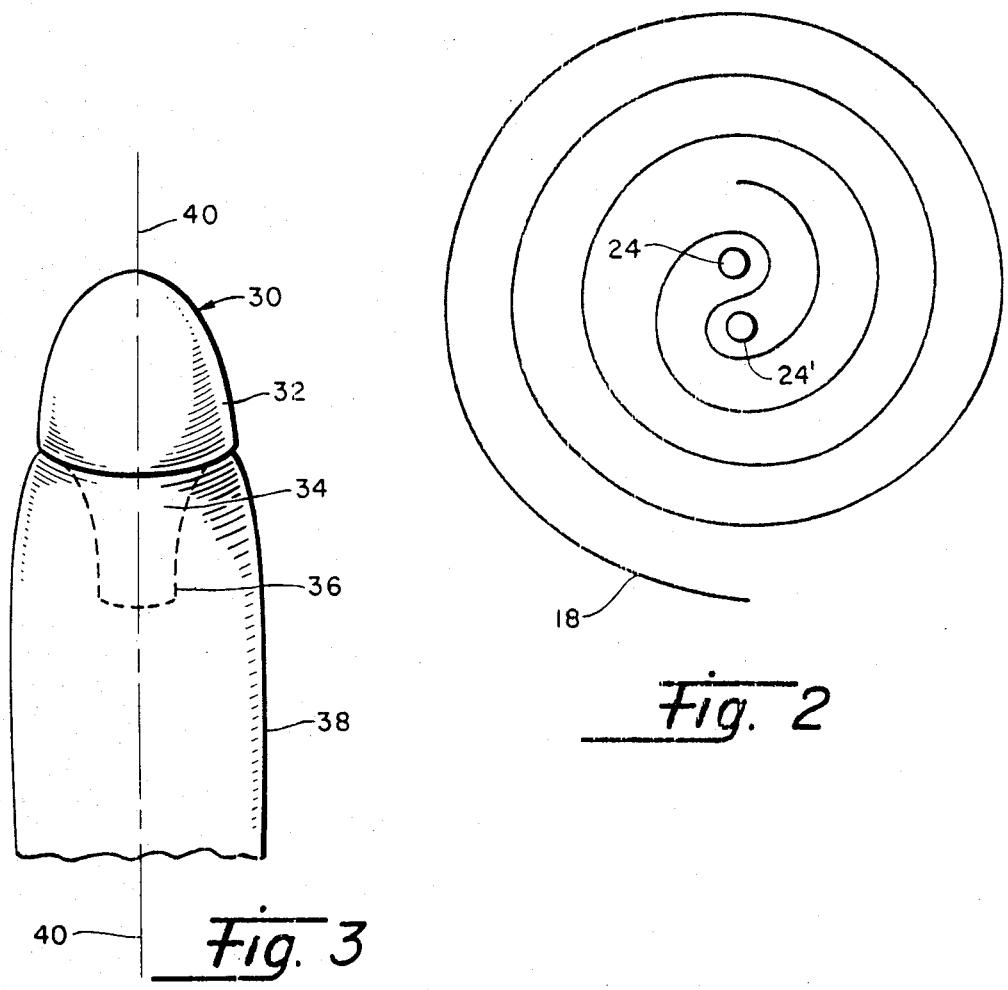
Fig. 2
Fig. 3

CIRCUMFERENTIALLY WRAPPED CARBON-CARBON STRUCTURE

RIGHTS OF THE GOVERNMENT

The invention described herein may be manufactured and used by or for the Government of the United States for all governmental purposes without the payment of any royalty.

BACKGROUND OF THE INVENTION

This invention relates to carbon-carbon composite materials, particularly reinforced carbon-carbon composites for reentry vehicle nosetips.

Recent advances in the field of aerospace technology have created a need for high-strength, temperature-resistant materials that possess the necessary properties needed to protect reentry vehicles from the severe thermomechanical stresses encountered within the reentry environment. A wide range of reinforced, three-directional composite structures are now available. These composites generally consist of graphite fiber reinforcement which is oriented in at least three directions and a graphitic matrix. The simplest of these structures is the three-directional (3D) structure which has reinforcing elements which are mutually orthogonal. The most complex is a thirteen-directional (13D) structure. The 3D structure can be constructed by piercing perpendicular to a stack of parallel woven fabrics, or by orthogonal weaving. These carbon-carbon composites provide excellent ablation performance with acceptable thermostructural properties, but at high cost. What is desired is a composite structure which provides ablation peformance and thermostructural response at least equal to the composite structures provided heretofore, and which is lower in cost than the current structures.

Accordingly, it is an object of the present invention to provide an improved carbon-carbon composite structure.

Another object is to provide a method for fabricating an improved carbon-carbon nosetip preform for a reentry vehicle.

A further object is to provide an apparatus for fabricating an improved nosetip preform.

Other objects and advantages of the present invention will be apparent to those skilled in the art.

SUMMARY OF THE INVENTION

In accordance with the present invention there is provided an improved carbon-carbon composite structure which consists essentially of a central core, a plurality of layers of circumferentially wrapped woven carbon fabric, and a carbon binder, wherein the central core consists essentially of a plurality of longitudinally oriented carbon fibers.

There is also provided a method for fabricating an improved carbon-carbon nosetip preform for a reentry vehicle which consists essentially of providing at least one rigidized carbon rod, providing a woven carbon fabric, winding the fabric circumferentially around the rigidized carbon rod to build up a desired thickness of fabric, impregnating the built-up structure with a suitable binder, carbonizing the binder and graphitizing the composite structure.

There is further provided an apparatus for fabricating a nosetip preform which comprises a two-drum surface winder, one drum of which has a surface cover adapted to grip and propel a carbon fabric.

DESCRIPTION OF THE DRAWINGS

In the drawing,

FIG. 1 is a diagrammatic representation of a two-drum surface winder of the type used in the present invention, FIG. 2 is an end view showing the initial winding of the carbon fabric around the carbon rods; and FIG. 3 is a pictorial representation of a nose cone which incorporates a nose tip manufactured according to the invention.

DETAILED DESCRIPTION OF THE INVENTION

The composite structure of the present invention consists essentially of a central core, a plurality of layers of circumferentially wrapped carbon fabric and a carbon binder. Referring to the drawing, FIG. 1 illustrates, somewhat schematically, the construction and operation of the two-drum surface winder 10 of this invention which consists essentially of a pair of similar rotatably supported and laterally spaced drums 12 and 14 of substantially the same diameter. Drum 12 is driven in the direction indicated by a belt and pulley arrangement as illustrated at 16 or by a chain and sprocket or other suitable driving means. Drum 14 is free rotating and will, in operation, rotate in the direction indicated.

The carbon fabric 18 is supplied to the winder 10 from rotatably supported feed roll 20. Tensioning means 22 are indicated as part of the roll support means for maintaining a suitable tension on the web 18. Wrapping of the fabric 18 is initiated by first passing the leading edge of the fabric web 18 through the gap 26 between rollers 12 and 14. Referring to FIG. 2, the leading edge of the fabric 18 is gripped between a pair of carbon rods 24 and 24', which are then clamped together at the sides of the fabric web. This assemblage is rotated by hand for several turns to frictionally secure the fabric to the rods. Referring again to FIG. 1, the partial roll 28 is then placed in the "V" above the gap 26 and any slack between the partial roll and the feed roll 20 is removed. The drive roll 12 is rotated, which imparts rotation to the roll 28 which in turn imparts rotation to the roller 14. A suitable wrapping tension is maintained on the fabric 18 by the tensioning means 22. Wrapping is continued until a desired diameter of the roll 28 is achieved. After wrapping the fabric web 18 is severed and the wrap end is secured with carbon yarn and wire screen to keep the resulting roll tightly wrapped.

A feature of the winder 10 is that the surface of drum 12, and optionally of drm 14, is covered with a semirigid, open cell elastomeric foam 29. The foam 29 provides the degree of friction necessary to drive the roll 28.

The fabric 18 and the rods 24 and 24' are fabricated from carbon yarn. Carbon yarns can be made by carbonizing any organic polymer yarn; however, commercially available carbon yarns are generally prepared from rayon, polyacrylonitrile (PAN) or pitch. The high performance fibers desired for use in the present invention are generally made from a PAN or pitch precursor. An example of a suitable carbon yarn is HM 1000, available commercially from Hercules, Inc., Wilmington, Del., which is made from a PAN precursor and has an end count of 1000 filaments per yarn bundle.

The fabric 18 may be any woven carbon fabric. The weave of the fabric can be plain, twill, satin or the like, with the satin weave being presently preferred. The carbon yarns used to weave fabrics generally have a thin coating of a polymer finish or sizing to protect the brittle fibers from self-abrasion during shipping and handling. The woven fabric may be coated with a sizing, such as polyvinyl alcohol (PVA), prior to the circumferential wrapping.

The fabric 18 may be a balanced fabric with equal numbers of wrap and fill threads, e.g., 11.8×11.8 ends/cm. Alternatively, the fabric 18 may have more fill threads than warp threads, e.g., 8.7×15.0 ends/cm. Winding of a fabric having an unequal end count provides a greater volume fraction of axial fibers. Also, metal wires may be added to each fill thread to increase the erosion resistance of the carbon-carbon structure.

It is within the scope of this invention to fabricate the roll 28 in homogenous fashion using a single type of fabric, and in graded fashion. The graded construction employs a high axial end count fabric in the first portion of the roll, e.g., 8.7×15.0 ends/cm for the first ⅓ radius of the roll, a balanced fabric in the second portion of the roll, e.g., 11.8×11.8 ends/cm for the second ⅓ radius of the roll, and a high warp end count fabric for the outer portion of the roll, e.g., 15.0×8.7 ends/cm for the outer ⅓ radius of the roll. In each case, the fill threads are parallel to the central core.

It is also within the scope of this invention to employ a bias-cut fabric to fabricate the roll 28. The bias-cut fabric has the warp and fill threads oriented at angles other than 0° and 90°, such as, for example, at ±45°. Bias-cut fabric is widely used in the power transmission belt and tire industries.

The rods 24 and 24' are of small diameter and may be prepared by uniaxially laying up a plurality of yarns and/or metal wires, impregnating the yarns with a suitable thermosetting resin, such as an epoxy resin, shaping the yarn bundle to a desired shape and allowing the resin to set. Alternatively, the yarns may be coated or impregnated with a thermoplastic or thermosetting resin, assembled to provide a desired end count, and the assembly then drawn through a suitably shaped, heated die. Suitable thermosetting resins include phenolic, epoxy and furanic resins and the like. Suitable thermoplastic resins include coal tar pitch, petroleum pitch, polyvinyl acetate, polyvinyl alcohol, arylic resin, and the like.

The composite is formed either by sintering the reinforcement structure by solidifying the impregnated precursor, thereby avoiding the requirement for other materials, or by the dry or liquid process, or by a combination of these processes. The dry process consists of providing deposition of pyrolytic carbon inside the structure of the reinforcement by decomposition of a hydrocarbon gas such as methane. In the liquid process, the porous texture of the reinforcement is impregnated with a thermosetting resin or a thermoplastic carbon precursor, such as a phenolic resin, a furanyl resin, coal tar pitch, petroleum pitch, or the like, that is converted to carbon by heat treatment. The impregnation and carbonization cycle is repeated as often as necessary to densify the composite to a desired degree.

A presently preferred method of processing consists of a rigidization cycle followed by densification. In the rigidization cycle, the circumferentially wrapped roll 28, after being wrapped with metal screen and tied, is vacuum impregnated with petroleum pitch at about 300° C. The impregnated preform is carbonized by heating under nitrogen at atmospheric pressure at a controlled rate, e.g., about 50° C./hr to about 350° C., and about 20° C./hr thereafter, to about 550° C. The thus-baked impregnated preform is then graphitized at about 1 atm and a temperature of about 2500° C. to provide a rigidized preform.

The rigidized preform is densified by impregnating the preform with a pitch, carbonizing the pitch and graphitizing the resulting carbon. The densification is repeated four times.

The reinforced composite of this invention is particularly useful for the fabrication of re-entry vehicle nose tips, such as the one shown by way of example in FIG. 3. The nosetip, designated generally by the reference numeral 30 comprises a tip portion 32 and a plug or pin portion 34 for fitting into a socket 36 in a nose cone 38. The nosetip 30 is machined from a billet of the reinforced composite of this invention, with the rods 24/24' running in the axial direction 40—40 of the nosetip.

The nosetip 30 is installed in the nosecone 38 by a pressure fit of the plug portion 34 into the socket 36, or by use of a suitable, high-temperature adhesive.

A feature of the present invention is that the rods 24 and 24' become an integral part of the reinforced composite upon rigidization, densification and graphitization of the composite.

Variations and modifications can be effected within the spirit and scope of the invention as described hereinbefore and as defined in the appended claims.

We claim:

1. A method for fabricating a carbon-carbon nosetip preform for a re-entry vehicle which comprises the steps of:
   a. providing a woven carbon fabric;
   b. providing at least two uniaxial rods, each rod consisting essentially of a plurality of uniaxial carbon yarns and a resin binder;
   c. gripping the leading edge of said fabric between said rods;
   d. circumferentially winding said fabric around said rods under a desired tension to a desired diameter to form a roll;
   e. securing the trailing edge of said fabric to prevent unwinding of said fabric;
   f. impregnating said roll with pitch;
   g. carbonizing the thus-impregnated roll;
   h. graphitizing and thus-carbonized roll;
   i. repeating said impregnating, carbonizing and graphitizing steps as necessary to achieve a desired material density.

2. The method of claim 1 wherein said fabric is a balanced fabric with equal numbers of warp and fill threads.

3. The method of claim 1 wherein said fabric has more fill threads than warp threads.

4. The method of claim 1 wherein said fabric has metal wires added to the fill threads over a portion of the fabric length.

5. The method claim 1 wherein said fabric providing step consists of providing
   a. a first fabric wherein the fill thread end count is greater than the warp thread end count;
   b. a second fabric wherein the fill thread end count is equal to the warp thread end count; and
   c. a third fabric wherein the warp thread end count is greater than the fill thread end count; and wherein said circumferential winding step consists of winding said first fabric around said rods for a first portion of one-half of said desired diameter, winding said second fabric over said first fabric for a second portion of one-half of said desired diameter, and winding said third fabric over said second fabric for the remaining portion of said one-half of said diameter.

6. A carbon-carbon composite structure consisting essentially of a central core, a plurality of layers of circumferentially wrapped woven carbon fabric, and a carbon binder, wherein said central core consists essentially of a plurality of longitudinally oriented carbon fibers.

7. The structure of claim 6 wherein said fabric has equal numbers of warp and fill threads.

8. The structure of claim 6 wherein said fabric has more fill threads than warp threads.

9. The structure of claim 6 consisting of three portions of said layers, wherein a first portion consists of a first fabric wherein the fill thread end count is greater than the warp thread end count, wherein a second portion surrounding said first portion consists of a second fabric wherein the fill thread end count is equal to the warp thread end count, wherein a third portion surrounding said second portion consists of a third fabric wherein the fill thread end count is less than the warp thread end count, wherein said fill threads are parallel to the longitudinal axis of said structure.

10. The structure of claim 6 wherein said fabric has metal wires added to the fill threads over a portion of the fabric length.

* * * * *